United States Patent [19]

Gamble

[11] Patent Number: 5,628,591
[45] Date of Patent: May 13, 1997

[54] AXLE PIVOT BORING TOOL

[76] Inventor: Bruce H. Gamble, Rte. 1, Box 173, La Feria, Tex. 78559-9738

[21] Appl. No.: 570,578

[22] Filed: Dec. 11, 1995

[51] Int. Cl.$^6$ .................................................. B23B 41/12
[52] U.S. Cl. ............................................. 408/75; 408/708
[58] Field of Search ............................ 408/75, 80–82, 408/708; 82/1.2, 1.4, 1.5

[56] References Cited

U.S. PATENT DOCUMENTS

| | | | |
|---|---|---|---|
| 4,573,837 | 3/1986 | Flaten | 408/708 |
| 4,730,958 | 3/1988 | Banoczky | 408/75 |
| 4,979,850 | 12/1990 | Dompe | 408/708 |

*Primary Examiner*—Steven C. Bishop

[57] ABSTRACT

An axle pivot boring tool is disclosed. Such tool comprises a plate having an enlarged circular aperture in a central extent thereof. A plurality of small apertures are symmetrically located therearound. A plurality of peripheral holes for mounting the plate on the upper extent of a tractor are provided. A cylindrical nut with an enlarged head and a cylindrical section is positionable in the large aperture for alignment purposes. A housing with a central bore and a radial flange is adapted to be bolted to the interior surface of the plate through the small apertures with bolts and nuts coupled therebetween. The central bore is adapted to receive the cylindrical section of the nut with a bearing sleeve therebetween. A primary shaft is positionable through the nut with an external end adapted to be coupled to a half-inch drill and an internal end with an axial recess and radial set screws. The lower end of the shaft also has a removable cutting element extending radially outward therefrom and is held in place by one of the set screws. A secondary shaft is positionable in the recess and held in place by another of the set screws.

4 Claims, 3 Drawing Sheets

AXLE PIVOT BORING TOOL

BACKGROUND OF THE INVENTION

1. Field of the Invention

The present invention relates to a new and improved axle pivot boring tool and, more particularly, pertains to repairing a worn front axle pivot mount of a tractor without having to remove the forward frame, casting and components.

2. Description of the Prior Art

The use of tools and assemblies of various designs and configurations is known in the prior art. More specifically, tools and assemblies of various designs and configurations heretofore devised and utilized for the purpose of boring holes in various objects through a wide variety of methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for repairing a worn front axle pivot mount of a tractor without having to remove the forward frame, casting and components. By way of example, U.S. Pat. No. 3,575,519 to Brumer and Strohauer disclose a drill guide assembly.

U.S. Pat. No. 3,864,839 to Wolf discloses a directional guide for power hand drill.

U.S. Pat. No. 5,163,792 to Slavik discloses a drill guide clamp apparatus.

U.S. Pat. No. 5,209,145 to Baudermann discloses a spherical boring tool.

Lastly, U.S. Pat. No. 5,312,409 to McLaughlin et al. discloses a drill alignment guide.

In this respect, the axle pivot boring tool according to the present invention substantially departs from the conventional concepts and designs of the prior art, and in doing so provides an apparatus primarily developed for the purpose of repairing a worn front axle pivot mount of a tractor without having to remove the forward frame, casting and components.

Therefore, it can be appreciated that there exists a continuing need for a new and improved axle pivot boring tool which can be used for repairing a worn front axle pivot mount of a tractor without having to remove the forward frame, casting and components. In this regard, the present invention substantially fulfills this need.

SUMMARY OF THE INVENTION

In view of the foregoing disadvantages inherent in the known types of tools and assemblies of various designs and configurations now present in the prior art, the present invention provides an improved axle pivot boring tool. As such, the general purpose of the present invention, which will be described subsequently in greater detail, is to provide a new and improved axle pivot boring tool and methods which have all the advantages of the prior art and none of the disadvantages.

To attain this, the present invention essentially comprises a new and improved axle pivot boring tool comprising, in combination, a plate having an interior surface and an exterior surface with an enlarged circular aperture in a central extent thereof and with a plurality of small apertures symmetrically located therearound and with a plurality of peripheral holes for mounting the plate on the upper extent of a tractor, the large aperture being located in axial alignment with the bearings of the axle pivot mount of a tractor to be bored; a cylindrical nut with an enlarged head and a cylindrical section positionable in the large aperture for alignment purposes, the nut having handle means extending generally radially therefrom; a housing with a central bore and a radial flange adapted to be bolted to the interior surface of the plate through the small apertures with bolts and nuts coupled therebetween, the central bore adapted to receive the cylindrical section of the nut with a bearing sleeve therebetween, the housing also having stability plates extending radially outward therefrom; a primary shaft positionable through the nut with an external end adapted to be coupled to a half-inch drill and an internal end with an axial recess and radial set screws, the lower end of the shaft also having a removable cutting element extending radially outward therefrom and held in place by one of the set screws, and a collar with a set screw wherein the collar acts as a movable flange on the shaft with the collar riding against a bearing which is press fit into the outer end of the nut and with a bearing in the end of the housing; a secondary shaft positionable in the recess and held in place by another of the set screws; an alignment bushing in the form of an annular collar positioned over the internal end of the primary shaft and the external end of the secondary shaft; and a half-inch drill coupled to the external end of the primary shaft to effect the rotation thereof and, consequently, the rotation of the cutting element to bore a front axle pivot mount.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved axle pivot boring tool which has all the advantages of the prior art tools and assemblies of various designs and configurations and none of the disadvantages.

It is another object of the present invention to provide a new and improved axle pivot boring tool which may be easily and efficiently manufactured and marketed.

It is a further object of the present invention to provide a new and improved axle pivot boring tool which is of a durable and reliable construction.

An even further object of the present invention is to provide a new and improved axle pivot boring tool which is susceptible of a low cost of manufacture with regard to both materials and labor, and which accordingly is then susceptible of low prices of sale to the consuming public, thereby making such tools and assemblies of various designs and configurations economically available to the buying public.

Still yet another object of the present invention is to provide a new and improved axle pivot boring tool which provides in the apparatuses and methods of the prior art some of the advantages thereof, while simultaneously overcoming some of the disadvantages normally associated therewith.

Even still another object of the present invention is to repair a worn front axle pivot mount of a tractor without having to remove the forward frame, casting and components.

Lastly, it is an object of the present invention to provide an axle pivot boring tool. Such tool comprises a plate having an enlarged circular aperture in a central extent thereof. A plurality of small apertures are symmetrically located therearound. A plurality of peripheral holes for mounting the plate on the upper extent of a tractor are provided. A cylindrical nut with an enlarged head and a cylindrical section is positionable in the large aperture for alignment purposes. A housing with a central bore and a radial flange is adapted to be bolted to the interior surface of the plate through the small apertures with bolts and nuts coupled therebetween. The central bore is adapted to receive the cylindrical section of the nut with a bearing sleeve therebetween. A primary shaft is positionable through the nut with an external end adapted to be coupled to a half-inch drill and an internal end with an axial recess and radial set screws. The lower end of the shaft also has a removable cutting element extending radially outward therefrom and is held in place by one of the set screws. A secondary shaft is positionable in the recess and held in place by another of the set screws.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
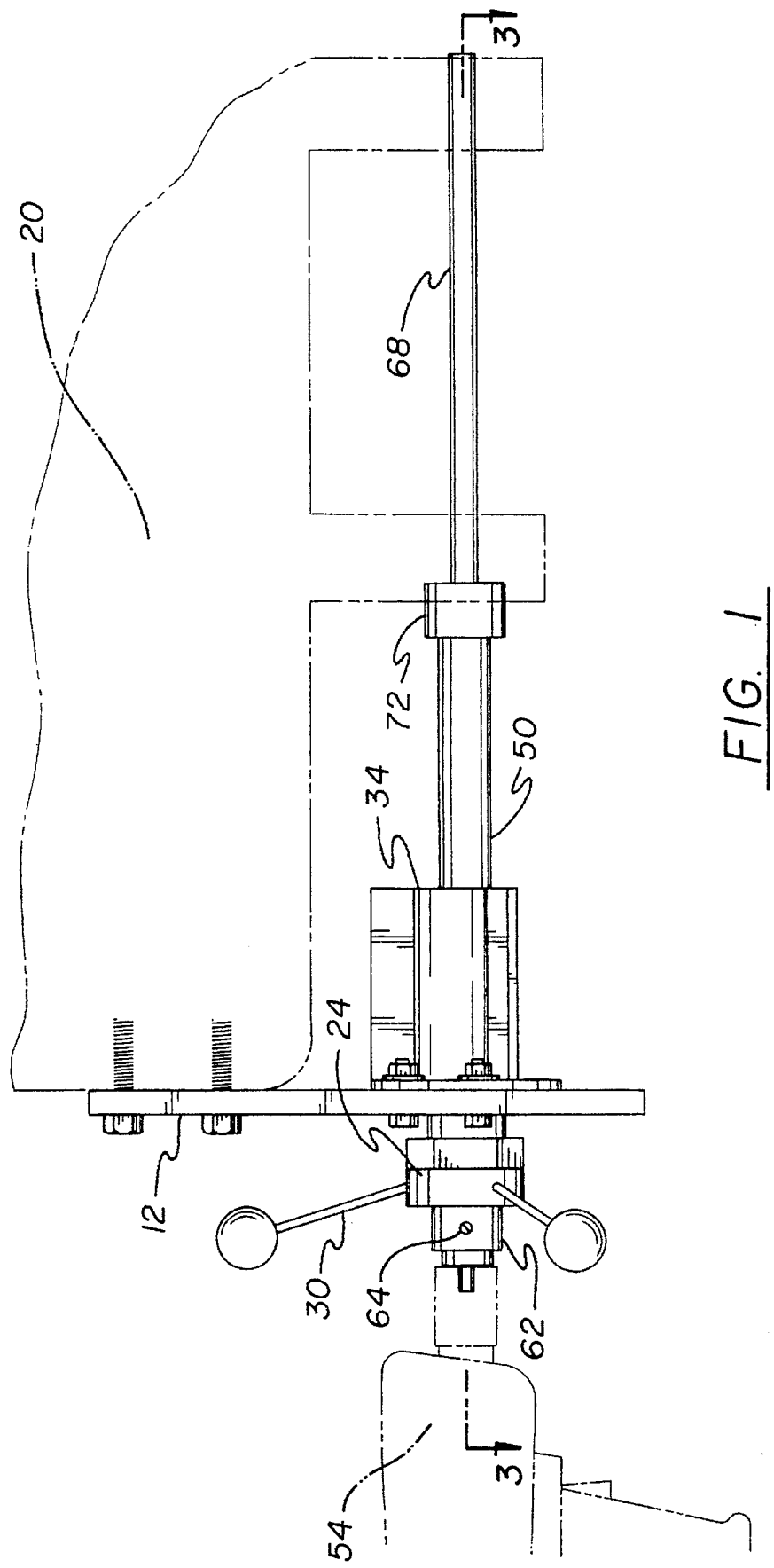
FIG. 1 is a side elevational view of the preferred embodiment of the new and improved axle pivot boring tool constructed in accordance with the principles of the present invention.
Figure 2:
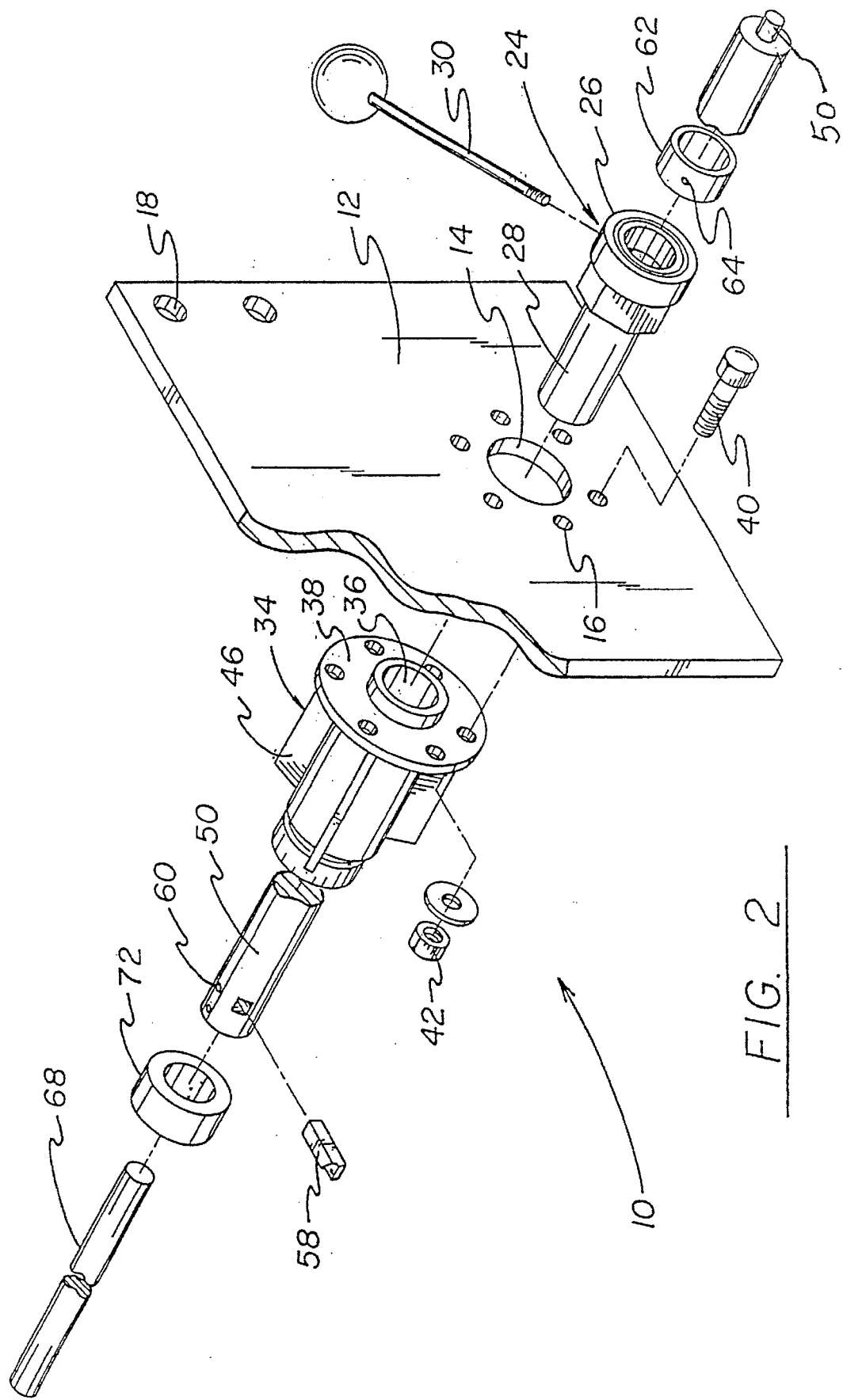
FIG. 2 is an exploded perspective view of the device shown in FIG. 1.
Figure 3:
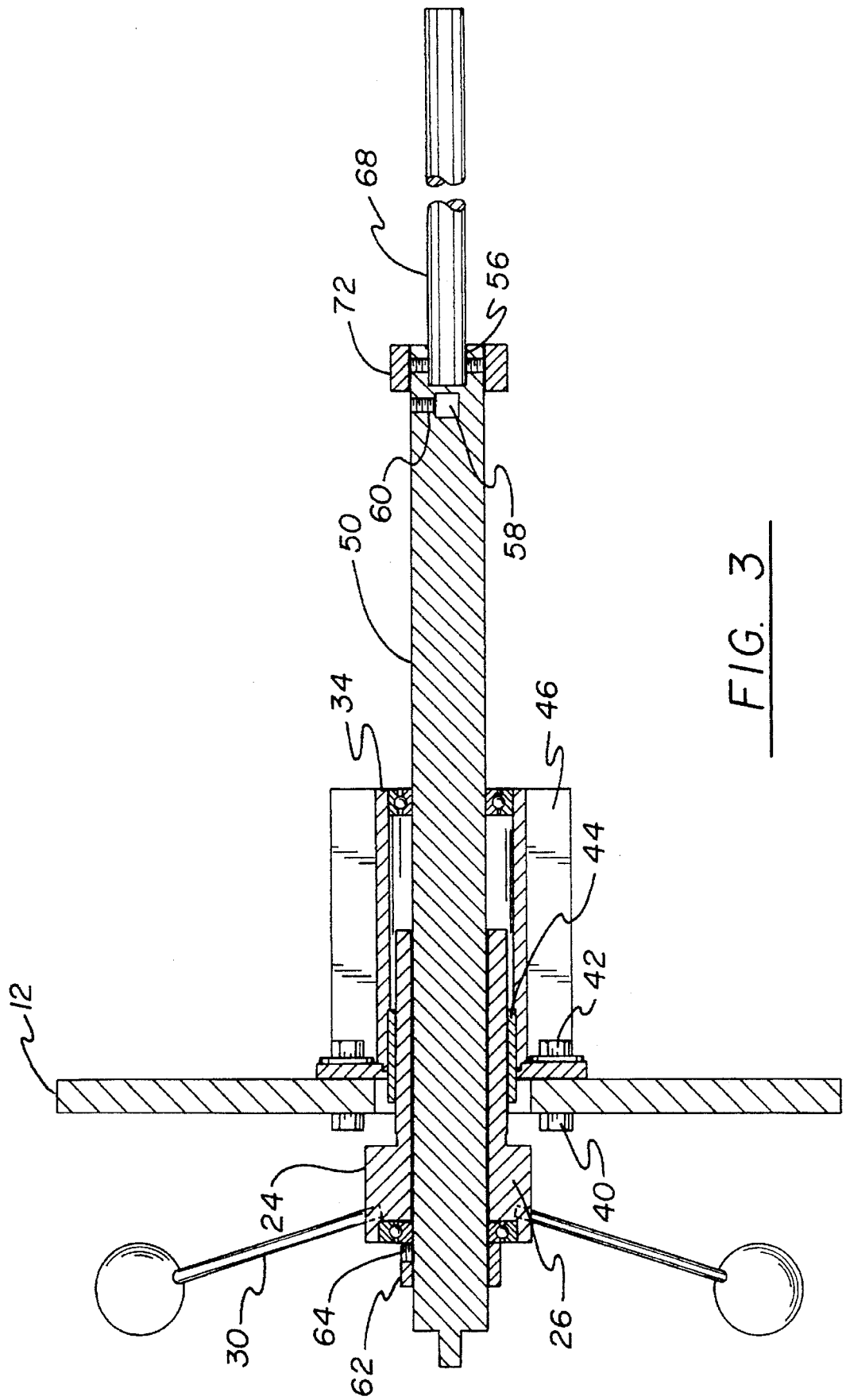
FIG. 3 is a cross sectional view taken along line 3—3 of FIG. 1.

With reference now to the drawings, and in particular to FIG. 1 thereof, the preferred embodiment of the new and improved axle pivot boring tool embodying the principles and concepts of the present invention and generally designated by the reference numeral 10 will be described.

The present invention, the new and improved axle pivot boring tool is a system 10 comprised of a plurality of components. In their broadest context, the components include a plate, a cylindrical nut, a housing, a primary shaft, a secondary shaft, an alignment bushing and a half-inch drill. Each of the individual components is specifically configured and correlated one with respect to the other so as to attain the desired objectives.

The central component of the present system 10 is a plate 12. Such plate has an interior surface and an exterior surface. It also has an enlarged circular aperture 14 in a central extent thereof. In addition, a plurality of small apertures 16 are symmetrically located around the enlarged aperture. A plurality of peripheral holes 18 are provided for mounting the plate on the upper extent of a tractor 20. The large aperture is located in axial alignment with the bearings of the axle pivot mount of the tractor to be bored.

Next provided is a cylindrical nut 24. Such cylindrical nut has an enlarged head 26 positioned adjacent to the exterior surface of the plate. It also has an elongated cylindrical section 28 positioned in the large aperture and extending internally of the interior surface for alignment purposes. The nut also has three handles 30 extending generally radially therefrom.

A housing 34 is next provided. Such housing has a central bore 36 and a radial flange 38. It is adapted to be bolted to the interior surface of the plate. Mounting is through the small apertures with associated bolts 40 and nuts 42 coupled therebetween. The central bore is adapted to receive a cylindrical section of the nut. A bearing sleeve 44 is located between the housing and the nut 24 with internal threads on the bearing sleeve 44 releasably coupled with external threads on the nut 24. The housing also has stability plates 46 extending radially outward therefrom.

A primary shaft 50 is positionable through the nut 24. The primary shaft is formed with an external end adapted to be coupled to a half-inch drill 54. It also has an internal end with an axial recess 56. Radial set screws are provided therein. The lower end of the shaft also has a removable cutting element 58 extending radially outwardly therefrom. It is held in place by one of the set screws 60. A collar 62 with a set screw 64 couples the nut and the primary shaft.

Positionable in the recess of the primary shaft is a secondary shaft 68. The secondary shaft is held in place by another of the set screws.

Lastly provided is an alignment bushing 72. Such bushing is in the form of an annular collar positioned over the internal end of the primary shaft. It is also positioned over the external end of the secondary shaft. In association with the components thereabove, during operation and use the device is coupled to a half-inch drill 54. Such coupling is to the external end of the primary shaft. This is to effect rotation of the primary shaft and consequently the rotation of the cutting element. Rotation of the cutting element thus functions to bore a front axle pivot mount in which it is located.

As can be seen in the various Figures, the shaft 50 is supported by two bearings and the collar 62 rides against the outer bearing.

The present invention greatly facilitates the repair of a worn front axle pivot mount on a John Deere tractor, without having to remove the forward frame casting and components.

The tool of the present invention is employed in conjunction with a ½ inch drill. It consists of a jig and boring bar which can be attached to the weight bracket mounting holes on the front of the tractor. The jig consists of a plate, steel shafts, jack screws, and bushings. The boring bar is of standard design and adapted to fit on the shaft driven by the drill. A feed device consisting of a brass nut with three handles extending out from it is used to feed the boring bar through the casting.

The jig permits aligning the boring head to the true original centerline of the worn casting. This is accomplished by using the rear axle pivot and the bottom of the front pivot hole. An alignment shaft is employed for adjusting the setup, and then replaced with the boring head. The head is manually fed into the casting by slowly rotating the brass nut. Repetitive passes are required to true up the hole diameter. A steel insert is then used to bring the hole down to original specs so original replacement bushings can be used.

Many hours of labor and downtime can be saved by using this tool and method for repairing worn axle pivots. Only the weights, weight bracket, and front axle need to be removed. The front casting, radiators, and hydraulic pump can remain in place.

Instructions for use are as follows:

The axle pivot boring tool is adapted for use with a drill. In the preferred embodiment the apparatus is utilized to bore holes in tractor axles. However, the apparatus may also be utilized to bore holes in the axles of a plethora of different types of vehicles and heavy machinery.

To utilize the apparatus a user first removes an axle from the subject vehicle. The user then places the secondary shaft into a new rear pin in the tractor and places the alignment bushing on the secondary shaft. The user then places the shaft into the housing and bolts the plate, nut, housing and primary shaft to the subject vehicle. The primary shaft is then attached to the secondary shaft. A user then slides the alignment bushing off of the primary shaft and onto the secondary shaft and removes the secondary shaft and the alignment bushing. The shaft assembly is slid to the front of the subject vehicle until the cutting element is placed into the primary shaft in front of the hole to be bored. A user places the cutting element against the front surface of the hole and slides the collar onto the primary shaft until it hits the nut. The collar is locked in place with the setscrews. The drill is then attached to the primary shaft and activated the drill until the hole has been cleaned out (returned to a true circle). A new bushing is then fabricated and driven into the hole. A brass rod is then inserted into the bushing to prevent the bushing from turning. A user then reinstalls the axle after replacing any required pins or bushings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved axle pivot boring tool comprising, in combination:

a plate having an interior surface and an exterior surface with an enlarged circular aperture in a central extent thereof and with a plurality of small apertures symmetrically located therearound and with a plurality of peripheral holes for mounting the plate on the upper extent of a tractor, the large aperture being located in axial alignment with the bearings of the axle pivot mount of a tractor to be bored;

a cylindrical nut with an enlarged head and a cylindrical section positionable in the large aperture for alignment purposes, the nut having handle means extending generally radially therefrom;

a housing with a central bore and a radial flange adapted to be bolted to the interior surface of the plate through the small apertures with bolts and nuts coupled therebetween, the central bore adapted to receive the cylindrical section of the nut with a bearing sleeve therebetween, the housing also having stability plates extending radially outward therefrom;

a primary shaft positionable through the nut with an external end adapted to be coupled to a half-inch drill and an internal end with an axial recess and radial set screws, the lower end of the shaft also having a removable cutting element extending radially outward therefrom and held in place by one of the set screws, and a collar with a set screw wherein the collar acts as a movable flange on the shaft with the collar riding against a bearing which is press fit into the outer end of the nut and with a bearing in the end of the housing;

a secondary shaft positionable in the recess and held in place by another of the set screws;

an alignment bushing in the form of an annular collar positioned over the internal end of the primary shaft and the external end of the secondary shaft; and a half-inch drill coupled to the external end of the primary shaft to effect the rotation thereof and, consequently, the rotation of the cutting element to bore a front axle pivot mount.

2. An axle pivot boring tool comprising:

a plate having an enlarged circular aperture in a central extent thereof and with a plurality of small apertures symmetrically located therearound and with a plurality of peripheral holes for mounting the plate on the upper extent of a tractor;

a cylindrical nut with an enlarged head and a cylindrical section positionable in the large aperture for alignment purposes;

a housing with a central bore and a radial flange adapted to be bolted to the interior surface of the plate through the small apertures with bolts and nuts coupled therebetween, the central bore adapted to receive the cylindrical section of the nut with a bearing sleeve therebetween;

a primary shaft positionable through the nut with an external end adapted to be coupled to a half-inch drill and an internal end with an axial recess and radial set screws, the lower end of the shaft also having a removable cutting element extending radially outward therefrom and held in place by one of the set screws; and a secondary shaft positionable in the recess and held in place by another of the set screws.

3. The apparatus as set forth in claim 2 and further including:

a half-inch drill coupled to the external end of the primary shaft to effect the rotation thereof and, consequently, the rotation of the cutting element to bore a front axle pivot mount.

4. The apparatus as set forth in claim 2 and further including:

an alignment bushing in the form of an annular collar positioned over the internal end of the primary shaft and the external end of the secondary shaft.

* * * * *